Feb. 26, 1935.  E. H. JOHNSON  1,992,430
PANNING MACHINE
Filed May 12, 1933   3 Sheets-Sheet 2

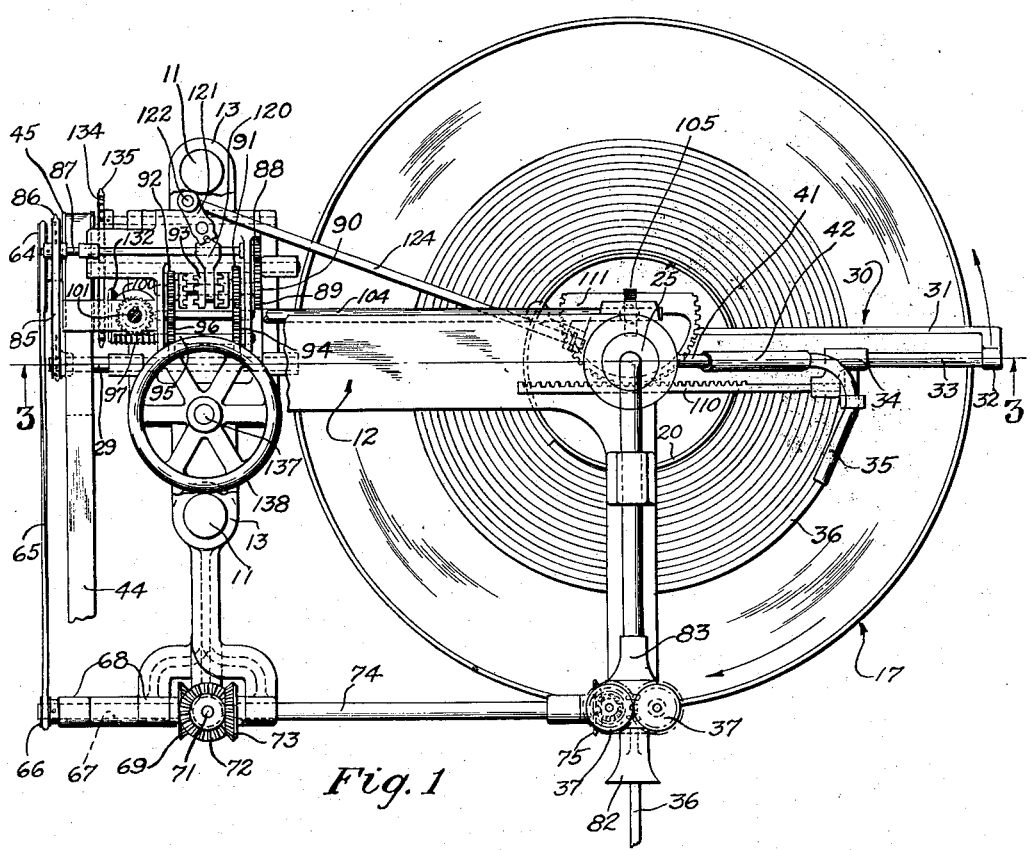

INVENTOR
Edgar H. Johnson
BY
Wooster & Davis
ATTORNEYS

Feb. 26, 1935.  E. H. JOHNSON  1,992,430
PANNING MACHINE
Filed May 12, 1933   3 Sheets-Sheet 3
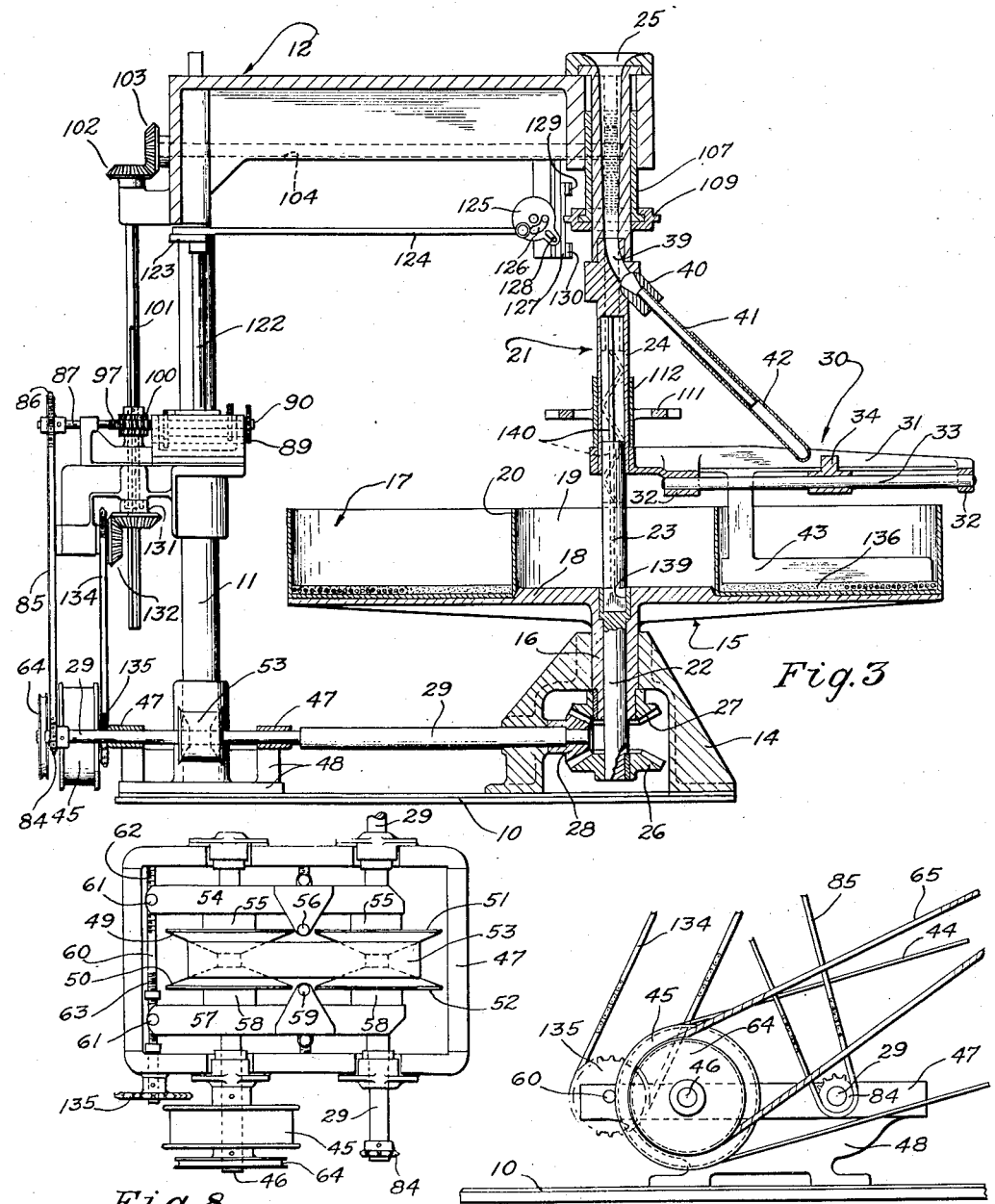

Patented Feb. 26, 1935

1,992,430

UNITED STATES PATENT OFFICE 1,992,430

PANNING MACHINE

Edgar H. Johnson, Putnam, Conn.

Application May 12, 1933, Serial No. 670,702

14 Claims. (Cl. 242—83)

This invention relates to new and useful improvements in panning machines and has for an object to provide a panning machine capable of depositing in talc, or other suitable powder, plastic materials extruded in long lengths, at a much greater speed than has heretofore been practical.

Another object is to provide a machine as indicated and which is of relatively simple construction and which is substantially automatic in its operation.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a top plan view of the improved machine, parts being broken away to show details of construction;

Fig. 3 is a vertical sectional view taken substantially along the line 3—3 of Fig. 1;

Fig. 4 is a detail view showing a gear segment and rack operated thereby;

Fig. 5 is a sectional view taken substantially along the line 5—5 of Fig. 4;

Fig. 6 is an elevational view showing the drive of a pair of feed rolls;

Fig. 8 is a plan view of a variable speed drive employed; and

Fig. 9 is a side view of the drive of Fig. 8, the chains and belts of the various sprockets and pulleys being shown in place.

Figures 2, 7:
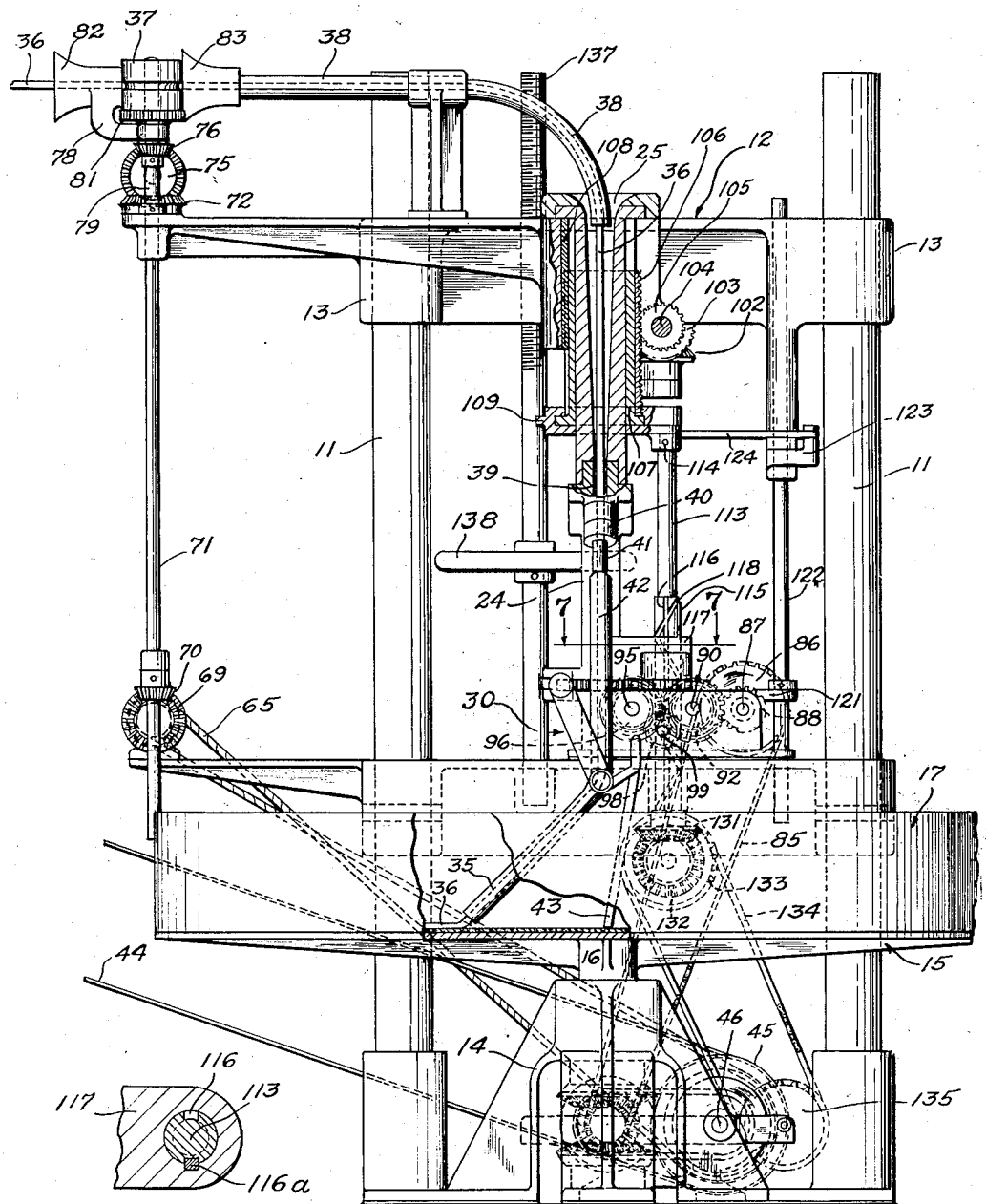
Fig. 2 is a side elevational view looking from the right in Fig. 1, parts being broken away to show details of construction.
Fig. 7 is a detail sectional view taken substantially along the line 7—7 of Fig. 2.

The function of the machine is to deposit products covered with plastic materials extruded in long lengths, in powdered talc or other similar powdered material of a nature capable of adapting itself to or conforming to and supporting the plastic material without deformation as it is laid in it and during the application of prolonged heat necessary to vulcanize or toughen the rubber or other material used.

It is customary to lay the extruded materials in pans, which are later removed and placed in the vulcanizing apparatus. Up to the present time the speed at which the pan containing the loose talc can be rotated without dislodging it by centrifugal action has fixed the limit of production speed to less than one-half the speed at which popular sizes of wire or other products can be extruded in such machines as are disclosed in my prior patents Nos. 1,516,968 November 25, 1924, 1,581,486 April 20, 1926, and 1,595,470 August 10, 1926.

Therefore with the panning machines heretofore available the extruding machines were limited to operation at less than half their possible production or capacity. With this new machine I can double or more than double the capacity of the panning machine without increasing the speed of rotation of the pan above that at which the pan can be rotated without dislodging the loose talc by centrifugal action, and thus am enabled to operate the extruding machines at more nearly their full capacity.

Referring in detail to the drawings, the improved machine includes any suitable bed or base 10 from which extends upright post-like supports 11 on which various parts of the mechanism are mounted as will later be more fully described, and on the upper portions of these posts there is slidably mounted a frame or support member 12. This frame or support 12 includes enlarged bearing portions 13 through which the uprights 11 pass and these bearing portions provide relatively large bearing surfaces whereby the member or frame 12 is capable of a sliding movement relative to the uprights.

A bearing or a housing member 14 is suitably mounted on the base 10, or if desired, this member 14 might be formed integral with said base. Disposed above and supported by the housing or bearing 14 is a platform or pan supporting member 15 including a tubular bearing portion 16 mounted in an opening in member 14 whereby the platform or pan support is adapted for rotation. Any or the usual pan 17 may be mounted on the platform 15 and said platform preferably includes a raised central portion 18 to enter into the central opening 19 of the pan to center the pan, which opening as best shown in Fig. 3 is defined by an inner wall 20.

Extending through the tubular bearing 16 is a sectional shaft 21, the said shaft including three rotatable sections 22, 23 and 24, of which the section 24 has its upper end constructed to cooperate with a tubular head 25 in a manner and for a purpose to be described. Shaft section 22 extends through the lower end of the bearing 16 and to the lower end of this shaft there is keyed or otherwise secured a beveled gear 26 while to the lower end portion of the bearing 16 there is secured a beveled gear 27. As shown, these gears 26 and 27 each mesh with a beveled gear 28 suitably secured to a horizontally disposed shaft 29 driven as will be hereinafter described, or the gears 26 and 27 may mesh with different gears on shaft 29. It will be apparent that when the pinion 28 is driven the platform or support 15 will be rotated in one direction while the shaft 21 will be rotated in the opposite direction.

Carried by the shaft 21 is a fleeting device 30 including an arm 31 extending radially of the pan 17 and this arm, in suitable brackets or bearings 32, carries a rod or bar 33 slidably mounting a member 34 carrying a guide tube 35. Material extruded in lengths, as for example, wire, covered with a suitable rubber composition or other insulating material is fed to the guide 35 and by it deposited in the pan 17. This material is designated 36 and is delivered from an extruding machine of any suitable type such as that disclosed in my patents above mentioned, to a pair of feed rolls 37 by which the material is fed through tubing 38 and then downwardly through the hollow head 25 and through an opening 39 in the upper end portion of the shaft section 24. The said opening or passage 39 as best shown in Fig. 3 communicates at one end with the opening through the head 25 and at its other end through a suitable ball and socket connection 40, with a tube 41. Tube 41 telescopes into a tube section 42 and the latter communicates with or discharges into the guide tube 35. Depending from and movable with the arm 31 is a combing blade 43 adapted to even or distribute soap stone, talc or other powder in the pan as will later be set forth.

Power is delivered to the machine from any suitable source as through a belt 44 trained over a pulley 45 on a shaft 46. Shaft 46 as does the shaft 29 forms part of a variable speed drive here disclosed as a Reeve's drive and best shown in outline in Figs. 8 and 9. The shafts have bearing in a frame 47 supported as by a base 48. Shaft 46 carries opposed cones 49 and 50 splined so as to be rotatable with the shaft but slidable thereon toward and from one another while the shaft 29 similarly mounts a pair of cones 51 and 52. A V-belt 53 is trained over the cones whereby the shaft 46 may drive the shaft 29. A bar 54 is connected with the cones 49 and 51 as at 55 and this bar is pivoted intermediate its ends as at 56. Similarly a bar 57 is connected with the cones 50 and 52 as at 58 and this bar is pivotally mounted as at 59.

It will be apparent that on the bars 54 and 57 being rocked toward and from one another about their pivots 56 and 59 the cones on the respective shafts will be carried toward and from one another. At its outer end each bar is connected with a threaded shaft 60 by a suitable block or nut 61 and it will be noted that the end portion 62 of the shaft is threaded in one direction while its end portion 63 is threaded in the opposite direction. Therefore, on the shaft 61 being rotated in one direction the outer or forward ends of the bars will be drawn toward one another and such ends will be moved apart on the shaft being rotated in the opposite direction. When the forward ends of the bars are moved toward one another cones 49 and 50 will be drawn toward each other while cones 51 and 52 will be moved apart. Belt 53 will then move inwardly on cones 51 and 52 so that such cones will provide an effective pulley of lesser diameter while the cones 49 and 50 will provide a pulley of greater diameter and the shaft 29 will therefore be driven at great speed. If the forward ends of the bars 54 and 57 are moved in the opposite direction then the effect will be the reverse and the effective pulley provided by cones 49 and 50 will be of lesser diameter while that provided by pulleys 51 and 52 will be of greater diameter, and the shaft 29 will be driven at lesser speed.

In addition to the pulley 45 the shaft 46 mounts a pulley 64 over which is trained a belt 65 and this belt is also trained over a pulley 66 on a shaft 67 mounted in any suitable bearings 68. Shaft 67 carries a beveled gear 69 meshing with a beveled gear 70 secured to a vertical shaft 71. The upper end portion of this shaft 71 carries a beveled gear 72 which in turn meshes with a beveled gear 73 on a shaft 74. This shaft 74 extends forwardly along one side of the machine and at its forward end carries a beveled gear 75 meshing with and driving a gear 76 on a short vertical shaft 77. Shaft 77 is mounted in a bracket 78 and also mounted in said bracket in parallel relation with the shaft 77 is a similar shaft 79. These shafts 77 and 79 are geared together by gears 80 and 81 whereby the shaft 77 drives the shaft 79 and the shafts are rotated in opposite directions.

It is the shafts 77 and 79 that carry the feed rolls 37 and the said rolls are therefore rotated in the manner to feed the extruded material 36 to and through the guide 35. A suitable funnel-like member 82 may be disposed to guide the material to the rolls and a similarly shaped member 83 may receive the material from the rolls. As the drive to the feed rolls 37 is from the pulley 64 on the constant speed shaft 46 it will be apparent that the feed rolls will be driven at a constant speed, and the selected speed is that at which the material is delivered by the extruding machine.

The variable speed shaft 29 carries a relatively small sprocket 84 over which is trained an endless sprocket chain 85 driving a sprocket 86 on a shaft 87. At its inner or forward end shaft 87 carries a gear 88 meshing with a gear 89 on a shaft 90 which shaft also carries gears 91 and 92 adapted to be selectively secured to the shaft by a shiftable clutch element 93. Gear 91 meshes with a gear 94 on a shaft 95 which shaft also carries a gear 96 and a worm 97.

It will be apparent that when gear 91 is clutched to shaft 90 it will drive the shaft 95 and worm 97 through the gear 94. An idler or intermediate gear 98 is mounted between and meshes with the gears 92 and 96 so that when the gear 92 is clutched to shaft 90 the shaft 95 and the worm 97 will be driven in a direction opposite to that in which they are driven when gear 91 is secured to shaft 90. The clutch element 93 is shifted along the shaft 90 at desired times whereby to reverse the direction in which the worm 97 and mechanism driven thereby is operated and the means for shifting this clutch element will later be described.

The worm 97 meshes with a worm gear 100 on a vertically disposed shaft 101 which at its upper end carries a beveled gear 102 meshing with a beveled gear 103 secured to a horizontally disposed shaft 104. This shaft 104 is mounted in suitable bearings carried by the upper member or support 12 and extends toward the central portion of the machine and at its inner end carries a pinion 105 meshing with a rack 106 carried by a sleeve 107 vertically slidable on the tubular head 25. Sleeve 107 is secured against rotary movement as by a feather 108 carried by the central portion of the support 12 and at its lower end this sleeve carries a ring-like member 109. Means are provided whereby when the shaft 104 is rotated first in one direction and then in the opposite direction this movement of the shaft will result in a raising and lowering of the sleeve 107 and member 109 carried thereby.

Secured to the slide 34 carrying the guide 35 is a rack 110 and meshing with this rack is a gear segment 111 including a hub portion 112. A shaft 113 is secured to the member 109 in any suitable manner as by a pin 114 and the lower end of this shaft is enlarged at 115 and provided with a key-way 116 cooperating with a key 116a in a fixed bearing 117 whereby the shaft is secured against rotary movement. Obviously, this shaft 113 will be reciprocated vertically as the member 109 is moved up and down. The enlarged portion of the shaft is provided with a spiral groove or key-way 118. This lower portion of the shaft passes through the hub of the gear segment 111 and such gear segment carries a key 119 operating in the spiral groove 118. With this arrangement it will be clear that as the shaft 113 is reciprocated the gear segment 111 will be oscillated due to cooperation of the spiral groove 118 with the gear carried pin 119. As the gear segment is oscillated it will reciprocate the rack 110 and the guide 35 will be moved back and forth radially of the pan 17.

Connected with the clutch element 93 is an operating arm 120 adapted to be shifted by an arm 121 secured to the lower end portion of a vertically disposed shaft 122 and secured to this shaft intermediate its end is a crank arm 123. A rod or link 124 is secured at one end of its ends to this crank 123 and at its other end to a reversing means 124 including a pivoted disc-like member 125 to which the said rod or link is eccentrically connected at 126. Member 125 is adapted to be oscillated about its pivot within the limits set by a pin in a slot 126 and the member is controlled by a slide 127 to which it is pivotally connected at 128. Projections 129 and 130 are carried by this slide in position to be engaged by the member 109 as it reaches the limits of its movement and when member 109 engages the projection 129 the rod 124 is pulled to operate the shaft 122 whereby the clutch element 93 will be shifted to clutch the gear 92 to the shaft 90. This will result in the pinion 105 being driven in reverse direction so that the member 109 will then be carried downwardly until it engages projection 130 when the clutch element will be shifted in the opposite direction to again reverse the direction in which the worm gear 97 is operated.

Below the worm gear 100 the shaft 101 is splined to a bevel gear 131 meshing with and driving a beveled gear 132 on the shaft with a sprocket 133 over which is trained a chain 134 also operating over a sprocket 135 on the shaft or shifting screw 60. As above set forth owing to the shifting of the clutch element 93 the shaft 101 is alternately driven in opposite directions and consequently the chain 134 will alternately be driven in opposite directions and will so drive the shaft or screw 60. When this shaft is driven in one direction the cones 49 and 50 will be shifted toward one another while the cones 51 and 52 are moved apart and when the shaft is driven in the opposite direction the cones 49 and 50 will be moved apart while the cones 51 and 52 are moved toward one another. This shifting of the cones effects a change in the speed at which the shaft 29 is driven and consequently changes or varies the speed at which the pan and fleeting device are driven and the speed at which the pinion 104 is driven, and thus rotation of the shaft 60 varies the speed at which it is driven since through the variable speed gearing and the worm 97 the shaft 101 is driven.

In the operation of the device power is supplied as through the belt 44 with the result that the shaft 46 is driven at a constant speed. Through a belt 65 the shaft 67 is driven at a constant speed with the result that the feed rolls 37 are driven at a constant speed so that the material 36 is fed through the die 35 at a constant speed. Since this guide is fed inwardly and outwardly in a direction radially of the pan, the material is deposited in the form of a spiral as clearly shown in Fig. 1. Since the material is fed at a constant speed means are provided to coordinate the rate of relative movement between the pan and fleeting device with the rate of feed of material through the guide.

Obviously, a shorter length of material is required at each revolution of the pan when the material is being deposited adjacent the inner wall of the pan than at the outer wall. However, as the spiral layer grows toward the outer wall of the pan a considerably greater length of material is deposited at each revolution of the pan. The variable speed means of Figs. 8 and 9 serves to coordinate the rate of relative movement between the pan and guide whereby such rate of relative movement is constant and the same as the rate of feed of material through the guide.

When material is being deposited adjacent the inner wall 20 of the cam the cones are so disposed as to provide a relatively large pulley on the shaft 46 and a relatively small pulley on the shaft 29, and as the guide progresses toward the outer wall of the pan this condition is reversed so that the rate of rotation of the guide and pan decreases as the guide approaches the outer wall of the pan. During the next trip inward of the guide the condition is reversed and the rate of rotation of the pan and feeding device gradually increases. This change takes place since the shaft or screw 60 of the variable speed device is constantly being driven in one direction or the other by the chain 134, and the direction of movement of this chain is controlled by the position of the clutch element 93, the latter being shifted back and forth due to operation of the member 109 as above explained.

In the use of these panning machines insulation covered wire or tubing or the like is fed to the machines while the insulation or tubing is yet in a sticking condition and the machine is provided with a bed of soapstone powder or the like 136 into which the extruded material is deposited by the guide. After each layer of material is deposited the entire fleeting device is elevated a distance equal to the thickness of one layer of material and this elevating may take place either automatically or may be accomplished by manual means. In the drawings, the elevating or raising means is shown as including a threaded shaft or screw 137 to which is secured a manually operable wheel 138 adapted to be turned to elevate the fleeting device as each layer of material is deposited. If preferred, this may be connected to the reversing drive so as to be shifted automatically on each reversing movement of the fleeting device.

When a layer of material has been deposited powdered soap stone, talc or the like is placed on the layer and is evenly distributed thereover as by the combing blade 43. This material prevents the different layers of extruded material adhering to one another and when a pan is loaded it is removed from the machine and placed in an oven for vulcanizing or curing. Heretofore, the capacity of a panning machine has been limited since if the pan is rotated beyond a certain speed the powdered material as talc or the like is thrown against the outer wall of the machine by centrifugal action. With the present arrangement the capacity of a machine is very materially increased since the fleeting device including the guide is rotated in a direction opposite to the direction of rotation of the pan and the rate of relative movement between the pan and guide may be doubled or even increased above this if the fleeting device or guide arm is rotated faster than the pan, without increasing the speed of the pan.

As above suggested, when a pan is loaded it is removed from the machine. To enable the pan to be conveniently removed the shaft section 22 is provided in its upper end with a non-circular (such as square) socket 139 receiving the non-circular (similarly shaped) lower end portion of the shaft section 23. Therefore, these shaft sections may be separated to permit of removal of the pan from the platform or support 15, but when the end of section 23 is in the socket it is driven by section 22. Additionally, the shaft section 24 is for the greater portion of its length, tubular whereby the shaft section 23 may be telescoped into the shaft section 24, and to establish a driving connection between shaft sections 23 and 24 they are splined as at 140.

Having thus set forth the nature of my invention, what I claim is:

1. In a panning machine, means for supporting and rotating a pan, a fleeting device including a guide, means for feeding a length of material through said guide to deposit said material in the pan, and means for rotating said fleeting device in a direction opposite to that in which the pan is rotated whereby to increase the rate of relative movement between the pan and guide without increasing the rate of rotation of the pan.

2. In a panning machine, means for supporting and rotating a pan, a fleeting device including a guide, means for feeding a length of material through said guide to deposit such material in the rotating pan, means for moving said guide radially of the center of the pan as the latter is rotated whereby the material is deposited in the pan in a spiral layer, and means for rotating said fleeting device in a direction opposite to that in which the pan is rotated whereby to increase the rate of relative movement between said pan and guide without increasing the rate of rotation of the pan.

3. In a panning machine, means for supporting and rotating a pan, a fleeting device including a guide, means for feeding a length of material through said guide to deposit such material in the rotating pan, means for shifting said guide radially of the center of the pan as the latter is rotated whereby the material is deposited in the pan in a spiral layer, means for rotating said fleeting device in a direction opposite to that in which the pan is rotated whereby to increase the rate of relative movement between said pan and guide without increasing the rate of rotation of the pan, and means whereby as said guide is moved radially of the pan the rate of relative movement between the guide and pan is coordinated with the speed of the feed of the material to the guide.

4. In a panning machine, means for supporting and rotating a pan, a fleeting device including a guide, means for feeding a length of material at a constant speed through said guide to deposit such material in the rotating pan, means for shifting said guide radially of the center of the pan as the latter is rotated whereby the material is deposited in the pan in a spiral layer, means for rotating said fleeting device in a direction opposite to that in which the pan is rotated whereby to increase the rate of relative movement between said pan and guide, and means whereby as said guide is moved radially of the pan the rate of relative rotation of the guide and pan is varied to coordinate the rate of relative movement of the guide and pan with the speed of the feed of material to the guide.

5. In a panning machine, a platform including a tubular central bearing portion, a shaft extending through said bearing portion, a pan on said platform, a fleeting device on said shaft above said platform, said fleeting device including a guide, means for feeding a length of material through said guide to be deposited in said pan, a gear on said bearing, a gear on said shaft, a third gear meshing with each of said gears, and means for rotating said third gear whereby said pan and fleeting device will be rotated in opposite directions.

6. In a panning machine, a platform including a tubular central bearing portion, a shaft extending through said bearing portion, a pan on said platform, a fleeting device on said shaft above said platform, said fleeting device including a guide, means for feeding a length of material through said guide to deposit said material in said pan, a gear on said bearing, a gear on said shaft, a third gear meshing with each of said gears, means for rotating said third gear whereby said pan and fleeting device will be rotated in opposite directions, means for moving said guide radially of the center of the pan whereby the material will be deposited in the pan in a spiral layer, and means whereby as the guide is moved radially of the pan the rate of rotation of said third gear is varied to coordinate the rate of relative movement of the guide and pan with the speed of the feed of material to the guide.

7. In a panning machine, means for supporting and rotating a pan, a fleeting device arranged above said pan, said fleeting device including an arm extending radially of the pan, a guide on said arm, means for feeding a length of material through said guide to deposit said material in the pan, means for shifting the guide along said arm whereby the material is deposited in a spiral layer, and means rotating said fleeting device in a direction opposite to the direction of rotation of the pan whereby to increase the rate of relative movement between the guide and pan without increasing the rate of rotation of the pan.

8. In a panning machine, means for supporting and rotating a pan, a fleeting device arranged above said pan, said fleeting device including an arm extending radially of the pan, a combing blade carried by said arm and operating in said pan to distribute powder placed in the pan, a guide on said arm, means for feeding a length of material through said guide to deposit said material in the pan, means for shifting the guide along said arm whereby the material is deposited in a spiral layer, and means rotating said fleeting device in a direction opposite to the direction of rotation of the pan whereby to increase the rate of relative movement between the guide and pan without increasing the rate of rotation of the pan.

9. In a panning machine, means for supporting and rotating a pan, a fleeting device arranged above said pan, said fleeting device including an arm extending radially of the pan, a guide on said arm, means for feeding a length of material through said guide to deposit said material in the pan, a rack connected with said guide, a gear segment meshing with said rack, means to oscillate said gear segment to reciprocate said rack and feed said guide back and forth along said arm whereby the material is deposited in the pan in spiral layers, and means for rotating said fleeting device in a direction opposite to the direction of rotation of the pan whereby to increase the rate of relative movement between the guide and pan without increasing the rate of rotation of the pan.

10. In a panning machine, means supporting a pan, a support above said pan, a fleeting device on said support above the pan, said fleeting device including an arm extending radially of the pan, a guide on said arm and movable back and forth along the same, a rack connected with said guide, a gear segment meshing with said rack, a member vertically movable on said support, a shaft carried by said member and passing through the hub of said gear segment and connected thereto by a key operating in a spiral slot whereby reciprocating movement of the shaft will result in oscillation of the gear segment to operate the rack and slide the guide back and forth along said arm, means to rotate the pan supporting means whereby to rotate the pan, means for feeding a length of material through the guide whereby said material is deposited in the pan, and means for raising and lowering said member on said support to reciprocate said shaft whereby to operate said guide and cause the material to be deposited in the pan in spiral layers.

11. In a panning machine, means for supporting and rotating a pan, a fleeting device including a guide, means for feeding a length of material through said guide to deposit such material in the rotating pan, means for moving said guide radially toward and from the center of the pan as the latter is rotated, means to raise said fleeting device each time the guide moves across the pan in either direction whereby the material is deposited in the pan in spiral layers, and means for rotating said fleeting device in a direction opposite to that in which the pan is rotated whereby to increase the rate of relative movement between said pan and guide without increasing the rate of rotation of the pan.

12. In a panning machine, means supporting a pan, a support above said pan, a fleeting device on said support above the pan, said fleeting device including an arm extending radially of the pan, a guide on said arm and movable back and forth along the same, a rack connected with said guide, a gear segment meshing with said rack, a member vertically movable on said support, a shaft carried by said member and passing through the hub of said gear segment and connected thereto by a key operating in a spiral slot whereby reciprocating movement of the shaft will result in oscillation of the gear segment to operate the rack and slide the guide back and forth along said arm, means to rotate the pan supporting means whereby to rotate the pan, means for feeding a length of material through the guide whereby said material is deposited in the pan, a rack on said member, a pinion meshing with said rack, means for driving said pinion, said means including reversing gearing, and a control means for said reversing gearing positioned to be engaged by said member as it reaches the limits of its movement whereby said member and shaft are operated up and down and said rack is reciprocated to feed the guide back and forth on the arm.

13. In a panning machine, means for supporting and rotating a pan, a fleeting device arranged above said pan, said fleeting device including an arm extending radially of the pan, a guide on said arm, means for feeding a length of material through said guide to deposit said material in the pan, a rack connected with said guide, a gear segment meshing with said rack, means to oscillate said gear segment to reciprocate said rack and feed said guide back and forth along said arm whereby the material is deposited in the pan in spiral layers, means for rotating said fleeting device in a direction opposite to the direction of rotation of the pan whereby to increase the rate of relative movement between the guide and pan without increasing the rate of rotation of the pan, and means whereby the rate of rotation of the guide and pan is varied as the guide is moved radially of the pan whereby to coordinate the rate of relative movement of the guide and pan with the speed of feed of material to the guide.

14. In a panning machine, means for supporting and rotating a pan, a fleeting device including a guide, means for feeding a length of material through said guide to deposit such material in the rotating pan, means for moving said guide radially of the center of the pan as the latter is rotated, means to raise said guide when the latter completes a radial movement in one direction whereby the material is deposited in the pan in spiral layers, and means for rotating said fleeting device in a direction opposite to that in which the pan is rotated whereby to increase the rate of relative movement between the pan and guide without increasing the rate of rotation of the pan.

EDGAR H. JOHNSON.